Oct. 10, 1972  R. G. FARNAM  3,697,348
METHOD OF MAKING GASKETS
Filed July 9, 1969  2 Sheets-Sheet 1
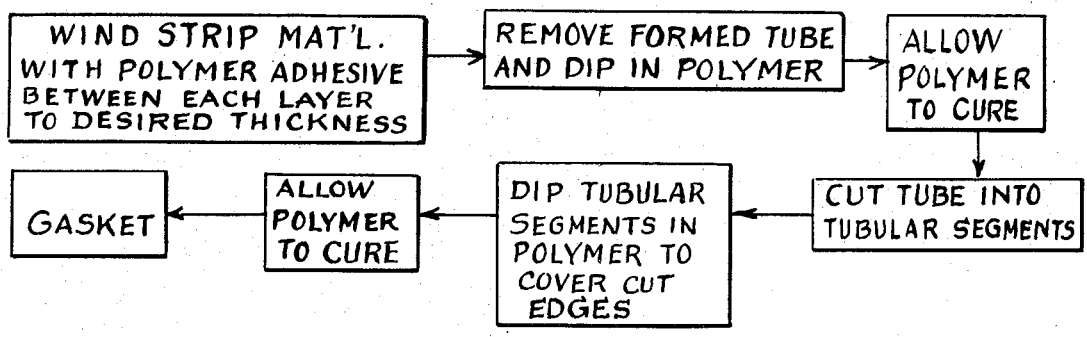
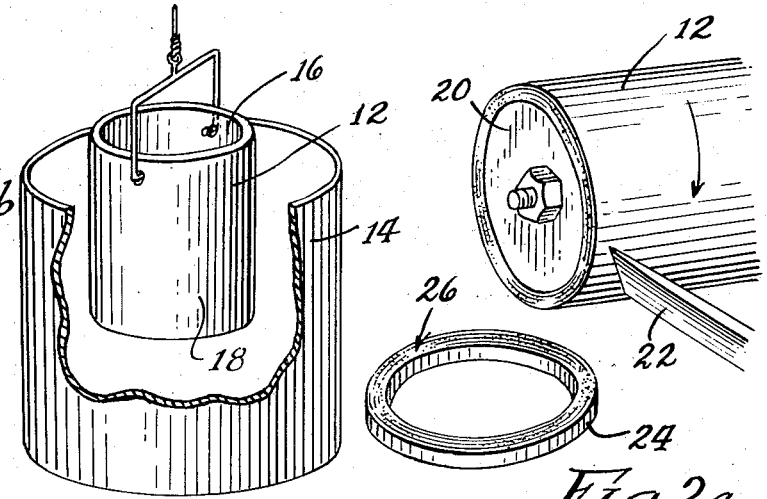
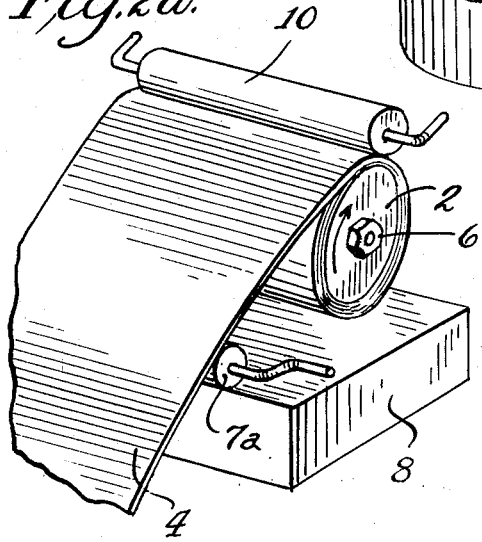
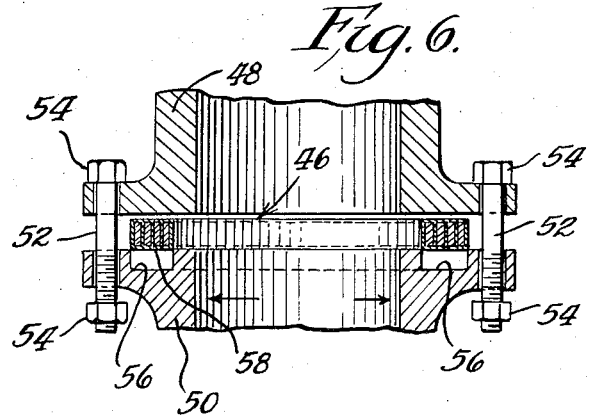
Inventor
Robert G. Farnam
By Mann, Brown & McWilliams
Attys.

Oct. 10, 1972  R. G. FARNAM  3,697,348
METHOD OF MAKING GASKETS
Filed July 9, 1969  2 Sheets-Sheet 2
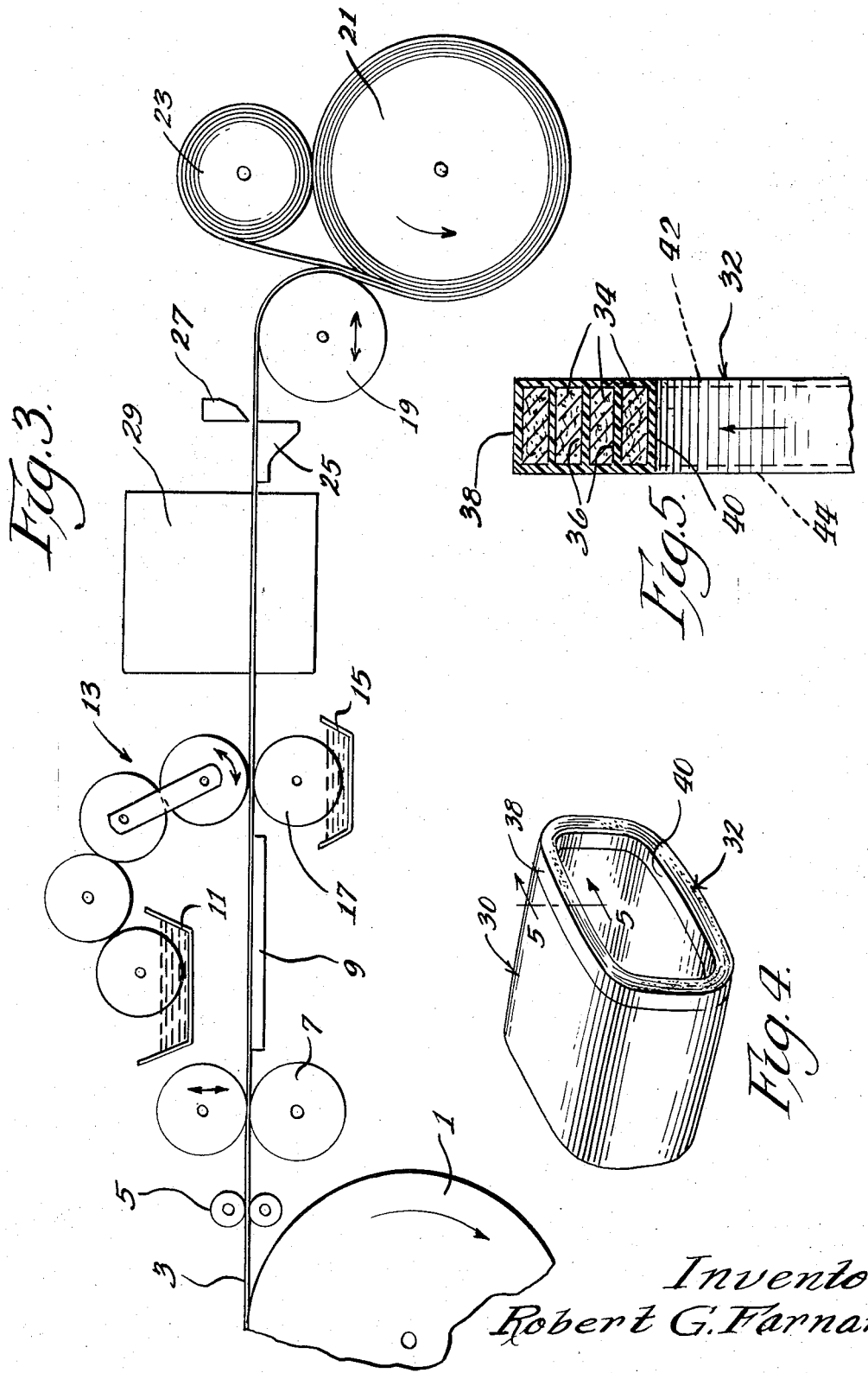
Inventor
Robert G. Farnam
By Mann, Brown & McWilliams
Attys.

though the core or mandrel may be left within the tube

United States Patent Office 3,697,348
Patented Oct. 10, 1972

3,697,348
METHOD OF MAKING GASKETS
Robert G. Farnam, New Lisbon, Wis., assignor to
F. D. Farnam Co.
Filed July 9, 1969, Ser. No. 840,171
Int. Cl. B65h 81/02
U.S. Cl. 156—190                                6 Claims

ABSTRACT OF THE DISCLOSURE

A gasket having improved sealing properties and the method of forming such a gasket wherein a continuous strip or web of gasket material is wound on a core with the core having a cross-sectional configuration corresponding to the internal configuration of the gasket being made. The web material is wound upon itself and, in the preferred embodiment, has a series of intermediate bonding layers of a fluid-impermeable polymer material which in the end product form a plurality of parallel fluid barriers to produce effective sealing. The winding of the web material on the core and the application of the polymer material to the web provides a tube which is then cut into preselected thicknesses to provide individual gaskets. Additional polymer material may be provided on the cut or exposed surfaces of the gasket if desired. The cross-sectional thickness of the gasket is dictated solely by the convolute gasket material and the polymer material layer or layers. One aspect of the improved method consists in preparing a roll of the gasket material which is to be wound on the core with the base material having applied to one or both sides thereof an adhesive coating which has been dried, at least to the extent that it will not adhere or cohere to itself when rolled upon itself, before the tube is formed.

BACKGROUND OF THE INVENTION

The prior art has, in some instances, formed gaskets and like articles by making rubber tubes either by winding rubber stock on a mandrel or by extrusion means and thereafter curing the formed rubber tube and cutting washer-type gaskets therefrom. It is also well known in the art to mold individual washer-like members which will have substantially the same configuration as those formed by the tube forming and cutting method.

One of the difficulties involved in making gaskets by winding web material on a mandrel resides in the fact that the bonding layer that is applied to one or both sides of the web material is difficult to handle when in the wet state and furthermore the thickness of this material cannot readily be controlled because of the pressure that is applied to the material as it is being wound upon the mandrel. The present invention, therefore, contemplates an improved way for applying the coating material to the base web material and for controlling its thickness in the final gasket product. Novel gaskets using the method of the invention are also disclosed.

SUMMARY OF THE INVENTION

Generally speaking, in one embodiment of the invention, there is disclosed a method of fabricating a gasket or the like comprising the steps, but not necessarily in the enumerated order, of coating a web of gasket material with a substantially fluid-impermeable, curable polymer material to form a barrier layer and winding the web in selected lengths on a core to form a laminate tube wherein the core has a cross-sectional peripheral configuration corresponding to the desired internal configuration of the gasket being made. In the preferred embodiment and in order to obtain a gasket that is dimensionally stable, the web is pre-coated, on one or both sides, with a polymer material and subsequently dried or partially cured prior to the formation of the laminate tube. The laminate tube may then be cut into a gasket of preselected thickness depending upon the use to which the individual gaskets are to be put. The cutting operation is conducted in a plane normal to the longitudinal axis of the laminate tube. Preferably, either before or during the forming of the laminate tube and/or after the cutting of the individual gaskets, at least one complete substantially fluid impermeable barrier on at least one complete convolution of the gasket is provided. The formation of layers of polymer on the web, and subsequent partial drying thereof, provides a means of building a gasket having any desired ratio of polymer and gasket material. A gasket may thereby be formed wherein the thickness is determined by the number of plies of the strip of gasket material and the at least one complete substantially fluid impermeable barrier. In the preferred embodiments, a series of parallel fluid impermeable barriers are formed by providing a polymer layer between each of the layers of gasket material. In any of the embodiments, the exterior peripheral and interior peripheral surfaces of the tube may be coated with polymer material to provide additional fluid impermeability and also to provide conformability to the gaskets when in actual use.

BRIEF DESCRIPTION OF THE DRAWINGS

FIG. 1 is a schematic flow diagram illustrating one method of the invention;

FIGS. 2a, 2b and 2c illustrate sequential steps in the formation of a gasket;

FIG. 3 schematically shows an exemplary industrial process for providing a coated web of material for use in fabricating the preferred form of gaskets in accordance with the invention;

FIG. 4 illustrates one form that the laminate tube may take and a gasket cut therefrom;

FIG. 5 is an enlarged section of one of the gaskets of this invention taken along the lines 5—5 of FIG. 4; and FIG. 6 shows how the gasket of this invention may be utilized.

DESCRIPTION OF THE PREFERRED EMBODIMENTS

Referring to the drawings wherein like numerals of reference indicate like elements throughout the several views and referring specifically to FIGS. 1, 2a, 2b and 2c, one form of the method of the invention, which is used to produce the gaskets, is illustrated. There are various alternate procedures and resulting embodiments which will be dealt with hereinafter but it should be emphasized at the outset that the specific descriptions with reference to the figures are for purposes of illustration only and are not to be taken as delimiting of the invention as defined by the claims appended hereto.

Generally, the method of the invention comprises providing a core or mandrel 2, the cross-section of which has a configuration to the internal configuration of the resultant gasket that is desired; it may be round, oblong or any polygonal shape. In this instance, the core or mandrel 2 takes the form of a cylindrical member having a round or annular cross-section as seen in FIG. 2a. The drum, mandrel or core 2 is rotated in direction of the arrow, winding thereon a continuous web or strip of gasket material 4 which may be any one of the well-known prior art gasket materials. The drum or core 2 is rotated by means not shown and may be secured to the revolving drum, axle, etc., as by means of nut 6. The mandrel or core 2 may be of the expanding type so that once the web of material, several plies thick, is wound on the core, the core or mandrel may be collapsed for ready removal of the thusly formed polygonal laminate tube 12.

In the embodiment illustrated, the web material has applied to the undersurface, as by roll 7a, an adhesive-type polymer material which upon curing becomes substantially fluid impermeable and which is contained in vat or reservoir 8. Superposed over core 2 is squeeze roller 10 which acts not only to evenly spread the polymer applied to the underside of the web 4 while it is being wound on the core 2, but also, depending on the pressure applied thereto, to control the thickness of the polymer coating. The excess polymer is driven to the extremities or edges of the web material where it may be allowed to run down into the receptacle or container 8.

The web of material 4 may be started on the core 2 by any well-known prior art means and no claim is laid to the specific type of apparatus utilized in the manufacture of the gaskets disclosed herein. Winding of the material continues until the selected number of plies of the material have been placed on one another in convolute form. The number of plies depends upon the ultimate thickness of the gasket required. Thereafter the material wound on the core 2 is separated from the continuous web 4 as by means of cutting or the like. The resulting laminate tube 12 is then removed from the core and may be, if desired, subjected to a coating or dipping process as per well-known means in the art. Where it is desired to provide such a coating (and for cut edges where desired) a polymer material such as a resin-elastomer composition is used which upon curing or setting becomes substantially fluid impermeable. The dipping of the tube 12 in the polymer will provide a coating on the interior surface 16 and the exterior surface 18 of the tube 12. After curing of the polymer as by means of heat, pressure or air drying, the tube 12 is placed on a mandrel such as 20 and secured thereto. The setting of knife blade 22, with relation to the end of the tube 12, will dictate the thickness of the gasket that is eventually cut from the tube 12. In this instance, a gasket 24 having a washer-like appearance, is cut from the tube 12. Desirably, but not necessarily, the gasket 24 is subjected to a dipping or coating procedure similar to that performed on the tube 12 so as to coat the cut or exposed side surfaces 26 (one surface 26 is not shown in FIG. 2c) of the formed gasket 24. After application of the polymer to the uncoated or raw edges, the polymer is allowed to cure and thereafter the gasket in finished form is made available and ready for use.

Using a method similar to the aforedescribed, satisfactory gaskets three inches in diameter and about .020 inch thick have been produced. The same general winding and cutting process may also be employed where the web of material already is provided with a layer of polymer on one or both sides. In this case, polymer adhesive may or may not be provided in conjunction with the winding process.

Referring now to FIG. 3, the preferred apparatus and method of forming the coated gasket material for use in making gaskets is schematically illustrated. The roll 1 of gasket material 3, such as fiber-reinforced synthetic rubber sheet packing about .015 inch thick is fed between the rollers 5 of a measuring device, not shown, into the nip of pull out tension rollers 7. Superposed over web support platen 9 is polymer material trough 11 and top surface coating roll system 13 which applies a preselected thickness of polymer material namely from about .0002 to about .005 inch of polymer material, to the top side of web. Likewise, bottom trough 15 and bottom roller 17 coat the underside of web 3. The coated web is driven by drive or gripper roll 19 through oven fixture 29 and wound on roll 21 in convolute fashion. A roll 23 carrying a web of slip sheet material, such as wax paper, or the like, is disposed between layers of coated material wound on roll 21. Cutting and support platen surface 25 and cooperating knife 27, mounted for reciprocal movement, completes the pre-coated roll manufacturing portion of the apparatus. Forming and cutting of the laminate tube into appropriate gaskets may take those forms already known in the art, or as heretofore described.

While the pre-coated web embodiment of FIG. 3 illustrates the pre-coating on both sides and subsequent oven drying of the web, in some instances the coating of polymer layer may be placed on only one side of the gasket material and drying of the polymer layer or layers either eliminated entirely or accomplished by exposure to the ambient atmosphere alone. In some instances, especially where a waxed slip sheet, for example, is placed between the convoluted and coated web, the polymer layer need not be dried, heated or partially cured.

The FIG. 3 web coating aspect of the invention allows for the provision of as thin or as thick a layer of polymer as may be desired, and of course additional thickness of polymer material may be applied continuously after any given drying and/or curing step. Additionally, by providing for drying between the coating of the web of gasket material and the formation of the laminate tube, a dimensionally stable gasket is ultimate obtained, since the passage of time and/or drying allows for shrinkage and the like to occur prior to gasket formation. Obviously, the other herein disclosed methods, wherein polymer layer application immediately precedes laminate tube formation without substantial intermediate drying, provide gaskets not having the high dimensional stability characteristics as heretofore indicated and, under some conditions, this may not be objectionable.

By the term drying, it is intended to include the exposure to light, heat, air or other ambient and artificial environmental factors that allow the coated web material to be rolled, in convolute form, upon itself without sticking adhesively or cohesively to itself. Sometimes, the provision of a slip sheet or web of such material will accomplish the same result. However, in any case, it is important that the final curing or setting up of the polymer layer take place only after the formation of the laminate tube or cut gasket. In some instances, it will be desirable to effect curing of the polymer after the individual gaskets have been cut from the laminate tube and, in some instances, curing may be effected by actual use of the gasket in its intended environment during which time a cured polymer is obtained.

Referring to FIG. 4, 5, and 6, more specific details of construction of a gasket 32 manufactured in accordance with this invention are illustrated. It will be seen that the core instead of being annular, is somewhat oblong in transverse section to thereby produce an oblong, multi-layered tube 30, the cross-section of which will correspond to the ultimate configuration of the interior surface of gasket 32. The gasket 32 in this instance comprises four plies of gasket material 34 interleaved with polymer layers or barriers 36. The polymer layers 36 are formed by application of a polymer adhesive to the underside of the gasket material 34 in continuous strip form as per methods previously described. As is fairly apparent, the coatings 38 and 40 applied to the outside and inside surfaces of the tube 30, respectively, may be formed when the oblong tube 30 is polymer coated. The polymer coatings or layers 42 and 44 may be applied as by means of dipping or otherwise coating the cut tubular segments once they are removed from the remainder of the tube 30, thereby forming a construction which integrally joins the exterior polymeric material with the parallel dams or barriers 36.

It is at once apparent that the number of plies or layers of material 34 are wholly dependent upon the number of turns or windings of the core or mandrel upon which the web of gasket is wound. The number of plies may be any number depending upon the ultimate use to which the gasket may be put. Ideally, the bond line or polymer layer 36 will be of sufficient depth or thickness so as to provide a plurality of fluid barriers. For instance, assuming in FIG. 5 that a fluid is being sealed against and the pressure or flow tendency of the fluid is in a direction of the arrow, any fluid passing through the gasket would have to first overcome five parallel, substantially fluid impermeable barriers or dams in order to work its way to the exterior surface of the gasket.

Referring specifically to FIG. 6, an individual gasket 46 is disposed between two flanged members 48 and 50, each of which cooperates to contain a fluid exerting pressure as indicated by the arrows. The flanged members 48 and 50 are held in fluid-tight relationship by well-known means such as through-bolts 52 and nuts 54. It will be noted that the bottom flanged member 50 has a cut-out groove or milled-out portion 56 adapted to receive and retain the gasket 46. Because of the exterior coatings or layers 42 and 44, the gasket 46 has great deformability and conformability so that the bottom surface 58 of the gasket 46 adjacent to the cut-out 56 will conform and deform to the cross-sectional area of groove 56. Obviously, the groove 56 may be of any configuration such as semi-circular, V-shaped, etc.

There has been illustrated and described several of the preferred forms of the invention. However, other embodiments of the invention will make themselves known to those of ordinary skill in the art and, for the most part, such deviations will not depart from the spirit and scope of the herein disclosed invention. For instance, the web or strip of gasket material may be applied on the core in bias or twisted fashion in which case a plurality of askew or slanted parallel layers (in cross-section) will be obtained. Other deviations will be specifically disclosed hereinafter.

The type of gasket material which may be used ideally comes in web or continuous strip form and may take a myriad of configurations and compositions. Thusly, various gasket materials such as cork, asbestos, various matrixes impregnated with vegetable fibers as well as mineral fibers and other such materials will be useful. Materials which have been found to be satisfactory and commercially available by the R. D. Farnam Co. are: a fiber reinforced rubber sheet sold under the trade name "Kaopak" No. B 1116-130; "Kaokork" Nos. 1652 or 57343; and "Kaobestos" Nos. 66013, 57090 or 63100. Thus, any number of commercially available prior art gasket materials will suffice in the practice of this invention. The thickness of such materials may be any suitable amount, but ordinarily from about .005 to 0.20 inch. Generally speaking, the ultimate use to which the formed gasket will be put will dictate the rigidity, stability and sturdiness of the various materials and components used. Utilizing the method of this invention wherein sheet gasket material had interpersed organic substances such as vegetable fibers, it was found that approximately two-thirds of the fibers will align themselves in a parallel fashion relative to the core or sheet on which or from which the gasket is fabricated. Approximately one-third of the vegetable fibers will stand on end so as to be normal to the sealing flanges in the specific environment in which the gasket is used. This is highly desirable from a torque retention standpoint. In other words, in some prior art gaskets, there is a great tendency for them to undergo stress relaxation. When this occurs, the gasket no longer functions properly. With the fibers aligned as above indicated, a superior gasket having high ability to oppose stress relaxation is obtained.

The polymer adhesive and/or polymer material layers used in fabricating the gaskets of this invention preferably is one which is characterized as having the ability upon curing to form a substantially fluid impermeable barrier. Types of these materials which have been found satisfactory include those which are thermal setting at a temperature of about 325°–400° F.

Other polymeric materials, resins and elastomers, having low permeability to water vapor and gases and which have requisite physical and chemical properties for the particular environment in which the gasket is to be used, may be used as a substantially fluid-impermeable barrier in the form of a film, or coating applied to a portion or all of one or both surfaces of the strip and, if desired, to the cut or raw edges of the gaskets. As examples of plastic materials which are useful may be mentioned polyamides, such as nylon 6 or nylon 6/6, polytrifluorochloroethylene, polyesters such as du Pont's Mylar, polyvinylfluoride such as du Pont's Tedlar, vinylidene chloride-vinyl chloride copolymers and polyamides such as Monsanto's AF–R–2009. The properties of these materials are given in the charts on pages 532–536 of Modern Plastics Encyclopedia, 1968 ed. published by McGraw-Hill Inc., New York. In general, I prefer to use plastics which have permeabilities to common gases and water vapor, as measured by the aforesaid chart, of not more than about 100. A preferred material is a blend of nitrile rubber and phenolic resin. It will be apparent that the materials should have the requisite resistance to heat and to chemicals and solvents, depending on whether the environment in which the gaskets are to be used is such that they will be exposed to elevated temperatures and/or to solvents or chemicals.

Generally, the thickness of the polymer layer, either between plies of gasket material or as a coating on the interior or exterior of the gaskets, including cut or raw edges, will be about .0002–.005 inch. Other thicknesses will be dictated by other considerations of both materials and intended field of use of the gaskets made in accordance with the invention. Other polymeric materials, resins and elastomers may be used as disclosed in United States patent to Farnam et al. No. 3,158,526. As indicated earlier, a preferred material has been found to be a water dispersion of a blend of nitrile rubber, or neoprene, and phenolic resin.

In general, after the application of the polymer material either with or without drying and with or without a polymer adhesive or an exterior coating or layer, it is subjected to a curing process. This may take the form of application of pressure and heat, heat alone or merely air drying for a period of time in order to allow the particular material to satisfactorily cure. Where it is desired to utilize and form a plurality of discrete polymer barriers, the gasket material web may itself be coated with the material and then the web cured or left uncured, the final curing being carried out after the formation of the laminated tube. In some instances, as will be later hereinafter pointed out, adhesive layers between plies of the gasket material are not utilized. However, where it is desired to form a plurality of fluid barriers or dams, in contradistinction to the present art of laminating, it is desired to have a relatively thick bond line and, generally speaking, this bond line will be in a range of about .003–.005 inch.

Also contemplated are gaskets which are formed by winding a continuous strip of gasket material upon itself without the use of a polymer adhesive therebetween and wherein a single fluid impermeable barrier is formed either on the inside of the formed tube or on the outside of the formed tube. It may be desirable to provide the substantially fluid impermeable barrier interleaved between several layers or plies of gasket material with nothing more where the end use of the gasket permits. Moreover, gaskets having a layer or polymer coating on the surfaces of the gasket normal to the layers making up the laminate are also contemplated. Thus, many different forms of gaskets are possible following the teachings of the herein-disclosed invention. Additionally, the laminate tube as well as the individual washer-like gaskets, once cut, need not be dip coated but may have a polymer layer or coating applied as by means of rolling and similar such procedures. It is only important in any one of these derivations that at least one complete discrete fluid impermeable barrier or layer be provided to inhibit fluid flow through the gaskets. Each of the aforedescribed modifications of the invention are intended to be covered by the claims appended hereto.

I claim:

1. The method of making gaskets having a predetermined internal configuration and a preselected resistance to fluid penetration in a direction normal to the central axis of the gasket, said method comprising:
    (a) taking a web of packing material,
    (b) coating at least one side of said packing material with a preselected thickness of a thermosetting polymeric adhesive material curable at temperatures within the range of about 325° to 400° F. and characterized by its ability to be dried and stored under normal room temperatures and by its substantial inability to penetrate the packing material wherein said thermosetting polymeric material is in the form of a coating adhering to said one side of said packing material,
    (c) stabilizing the selected thickness of said layer by drying the layer sufficiently to make it substantially adhesion and cohesion-free under substantially cure-free conditions,
    (d) winding said coated packing material upon a mandrel having a cross-sectional shape corresponding substantially to the precscribed internal configuration of the gasket, and while applying heat and pressure forming a convolute laminate tube on said mandrel, and with each convolution of packing material being separated from the adjacent convolution of packing material by uniformly thick discrete layers of said coating material, wherein each such layer acts as a fluid barrier to the radial passage of fluid through the convolute winding,
    (e) slicing the laminate tube into a plurality of gaskets by one or more knives operating radially thereof,
    (f) removing the individual gaskets from the mandrel, and
    (g) curing the packing material coating subsequent to said winding step.

2. The method of making gaskets as set forth in claim 1 in which the individual gaskets after being removed from the mandrel are coated on their cut faces with said polymeric material prior to the subsequent curing step.

3. The method of making gaskets as set forth in claim 1 in which the packing material is a fiber-reenforced water dispersion of a blend of synthetic elastomer and resin.

4. The method of making gaskets as set forth in claim 1 in which the packing material is a fiber-reenforced elastomer sheet.

5. The method set forth in claim 1 wherein:
    prior to winding on the core, the dried coated web is wound on a drum for storage, and is unwound therefrom when it is desired to form the convolute tube.

6. The method set forth in claim 3 wherein:
    the dried coated web is wound on a drum with the interposition of a slip sheet, and the slip sheet is removed before forming the convolute tube.

References Cited

UNITED STATES PATENTS

| | | | |
|---|---|---|---|
| 3,319,870 | 5/1967 | Haider et al. | 229—53 |
| 860,720 | 1/1907 | Adams | 156—193 |
| 1,162,384 | 11/1915 | Nichols | 156—193 |
| 1,348,755 | 8/1920 | Simpson | 156—193 |
| 2,175,399 | 10/1939 | Judd | 156—190 |
| 2,234,625 | 3/1941 | Diehl et al. | 156—190 |
| 2,255,504 | 9/1941 | Current | 156—194 |
| 2,360,830 | 10/1944 | Denman | 156—194 |
| 2,597,976 | 5/1952 | Cousins | 156—213 |
| 2,753,199 | 7/1956 | Victor | 288—21 |
| 2,802,513 | 8/1957 | Stoeckel et al. | 156—193 |
| 3,158,526 | 11/1964 | Farnam | 156—324 |

CARL D. QUARFORTH, Primary Examiner

G. G. SOLYST, Assistant Examiner

U.S. Cl. X.R.

156—192, 193, 194

UNITED STATES PATENT OFFICE
CERTIFICATE OF CORRECTION

Patent No. 3,697,343    Dated October 10, 1972

Inventor(s) Robert G. Farnam

It is certified that error appears in the above-identified patent and that said Letters Patent are hereby corrected as shown below:

IN THE SPECIFICATION: Column 3, line 64; between "material" and "namely" insert a comma; Column 3, line 65; between "web" and the period insert -- 3 --; Column 4, line 2; between "described" and the period insert -- using heat and/or pressure to activate or tackify the adhesive coating in forming the laminate tubes --;

IN THE CLAIMS: Claim 3 should read -- The method of making gaskets as set forth in Claim 1 in which the thermosetting polymeric material is a water dispersion of a blend of synthetic elastomer resin. -- not "The method of making gaskets as set forth in claim 1 in which the packing material is a fiber-reenforced water dispersion of a blend of synthetic elastomer and resin.".

Signed and sealed this 13th day of February 1973.

(SEAL)
Attest:

EDWARD M. FLETCHER, JR.
Attesting Officer

ROBERT GOTTSCHALK
Commissioner of Patents